US012646098B2

(12) United States Patent
Matteo et al.

(10) Patent No.: US 12,646,098 B2
(45) Date of Patent: Jun. 2, 2026

(54) USING A MODEL TO SUGGEST CHANGES TO AN ORDER TO USE UNSPENT CREDITS BEFORE A MACHINE-PREDICTED EXPIRATION OF SAME

(71) Applicant: Maplebear Inc., San Francisco, CA (US)

(72) Inventors: Domenico Matteo, San Mateo, CA (US); Joseph Olivier, San Bruno, CA (US); Mathieu Hartvick, Ottawa (CA); Lukasz Czekaj, North Las Vegas, NV (US); Alexander S. Piatski, New York, NY (US); Yiheng Wang, Sunnyvale, CA (US); Eric Cumalander, Denver, CO (US)

(73) Assignee: Maplebear Inc., San Francisco, CA (US)

( * ) Notice: Subject to any disclaimer, the term of this patent is extended or adjusted under 35 U.S.C. 154(b) by 276 days.

(21) Appl. No.: 18/427,385

(22) Filed: Jan. 30, 2024

(65) Prior Publication Data

US 2025/0245719 A1 Jul. 31, 2025

(51) Int. Cl.

*G06Q 30/00* (2023.01)
*G06F 40/40* (2020.01)
*G06Q 30/0601* (2023.01)

(52) U.S. Cl.

CPC ......... *G06Q 30/0631* (2013.01); *G06F 40/40* (2020.01)

(58) Field of Classification Search

CPC ................................................ G06Q 30/06–08
See application file for complete search history.

(56) References Cited

U.S. PATENT DOCUMENTS

| | | | | |
|---|---|---|---|---|
| 10,936,961 | B1 * | 3/2021 | Jain | G06N 5/01 |
| 2016/0350832 | A1 * | 12/2016 | Franklin | G06Q 30/0631 |
| 2022/0343381 | A1 * | 10/2022 | Yin | G06F 16/2379 |
| 2024/0078524 | A1 * | 3/2024 | Lidman | G06Q 20/4016 |
| 2025/0086706 | A1 * | 3/2025 | Anzalone | G06Q 20/202 |

OTHER PUBLICATIONS

Belikov, Dan, et al., "Smart Shopping Cart" 2019 18th RoEduNet Conference: Networking in Education and Research, pp. 1-6 (Year: 2019).*

* cited by examiner

*Primary Examiner* — Ethan D Civan
(74) *Attorney, Agent, or Firm* — Fenwick & West LLP

(57) ABSTRACT

A language model is utilized to generate a recommendation for a user of an online system to update a current order. The user is grouped into a cluster of users based on how likely is that the user will not use a credit before expiration. A prompt for input into the language model includes information about the cluster, content of a cart, and information about the credit. Based on the prompt, the language model generates a risk score for the user representing a likelihood of the user not using the credit. The online system identifies, based on the risk score and the content of cart, a quantity of an item for recommendation to the user. A user client device displays a user interface with a suggestion for the user to include the quantity of the item in the cart and use the credit for purchasing the suggested quantity of item.

20 Claims, 5 Drawing Sheets

Group User Of Online System Into Cluster Of Users, Based At Least In Part On How Likely Is That User Will Not Use, Before Expiration, Credit Provided To User That Expires After Threshold Amount Of Time
405

Generate Prompt For Input Into Large Language Model, Prompt Including Information About Cluster, Content Of Cart Of User, And Information About Credit
410

Request Large Language Model To Generate, Based On Prompt Input Into Large Language Model, Risk Score For User Representing Likelihood Of User Not Using Credit Before Expiration
415

Identify, Based At Least In Part On Risk Score And Content Of Cart, At Least One Of Quantity Of First Item From Cart Or Second Item Not Being In Cart For Recommendation To User
420

Cause Device Associated With User To Display User Interface With Suggestion For User To Include At Least One Of Quantity Of First Item Or Second Item In Cart And To Use At Least Portion Of Credit For Purchasing At Least Portion Of Cart
425

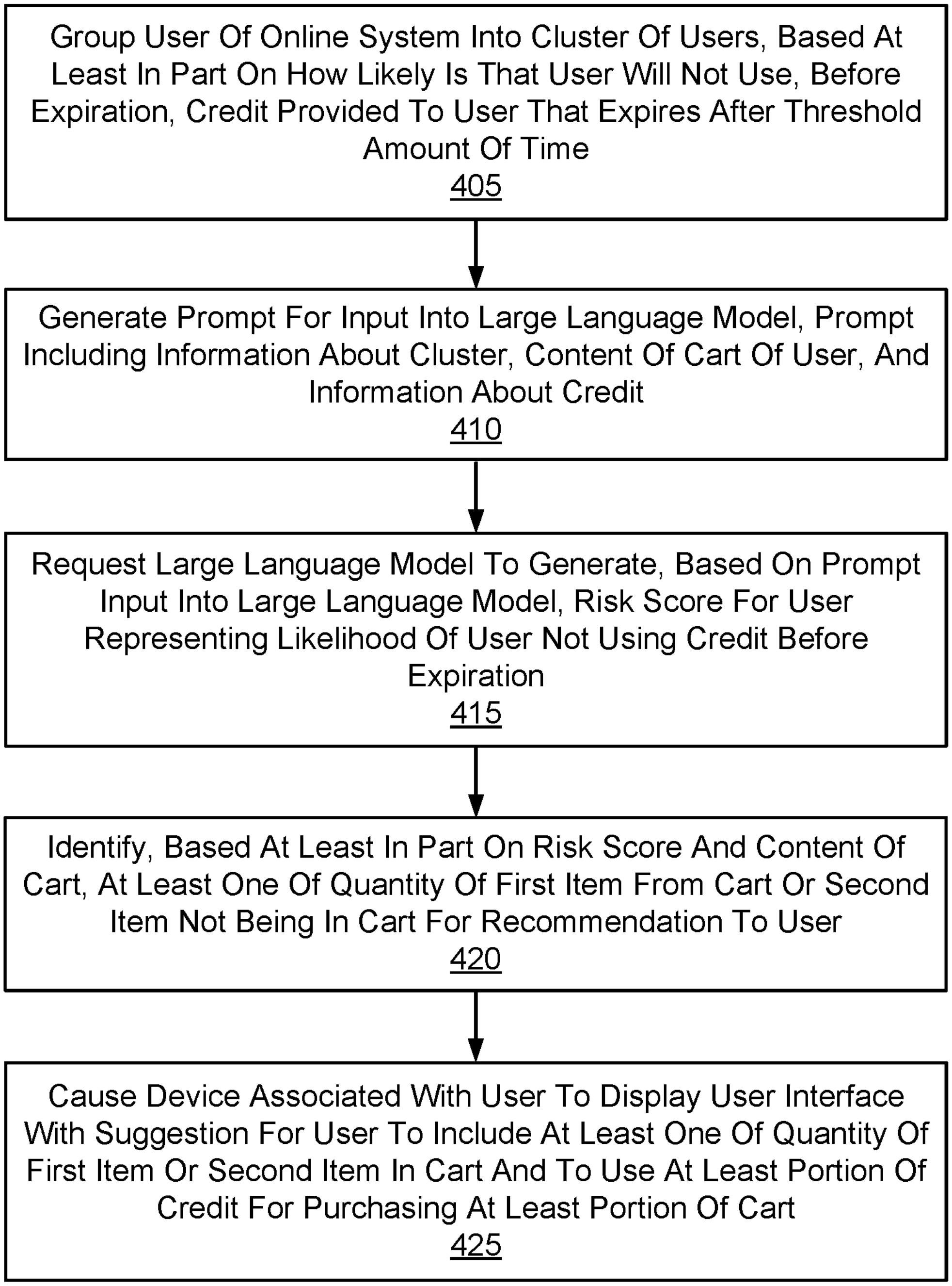

FIG. 4

USING A MODEL TO SUGGEST CHANGES TO AN ORDER TO USE UNSPENT CREDITS BEFORE A MACHINE-PREDICTED EXPIRATION OF SAME

BACKGROUND

Online systems, such as online concierge systems, may allow users to place orders with the online systems using credits. The credits can be provided to the users by various programs, such as directed spend programs that allow the credits to be used to acquire specific items. For example, directed spend programs may include food assistance programs funded by entities, such as nonprofits, employers, state or federal governments, etc., which provide credits that may be used to acquire specific items included among inventories of grocery store retailers associated with an online system. Once issued, credits may expire after a certain amount of time (e.g., at the end of each month or one month from the date they are issued). To prevent credits from expiring without being used, users may prioritize using these types of credits before using credit cards, gift cards, etc. when placing their orders. For example, a user placing an order with an online system may use credits provided by various assistance programs on at least a portion of the order based on when the credits expire, such that credits that expire the soonest are used first. In this example, the user may then use a credit card for any remaining balance on the order.

However, there is a technical problem of automatically notifying users of an online systems at a large scale required by the online system that their credits will soon expire, while at the same time providing appropriate per user recommendation on how to update their order and on which items the users should spend at least a portion of their credits that are about to expire.

SUMMARY

Embodiments of the present disclosure are directed to utilizing a model (e.g., language model or trained computer model) for suggesting to a user of an online system (e.g., online concierge system) an appropriate update of a current order that can be purchased using one or more credits before their expiration, where the one or more credits are provided to the user by one or more programs (e.g., directed spend programs).

In accordance with one or more aspects of the disclosure, the online system groups the user into a cluster of users, based at least in part on how likely is that the user will not use, before expiration, a credit provided to the user that expires after a threshold amount of time. The online system generates a prompt for input into a large language model (LLM), the prompt including information about the cluster, content of a cart of the user, and information about the credit. The online system requests the LLM to generate, based on the prompt input into the LLM, a risk score for the user representing a likelihood of the user not using the credit before the expiration. The online system identifies, based at least in part on the risk score and the content of the cart, at least one of a quantity of a first item from the cart or a second item not being in the cart for recommendation to the user. The online system causes a device associated with the user to display a user interface with a suggestion for the user to include at least one of the quantity of the first item or the second item in the cart and to use at least a portion of the credit for purchasing at least a portion of the cart.

BRIEF DESCRIPTION OF THE DRAWINGS

FIG. 4 is a flowchart for a method of using a language model to generate a recommendation for a user of an online concierge system to update an order placed at the online concierge system, in accordance with one or more embodiments.

DETAILED DESCRIPTION

Figure 1A:
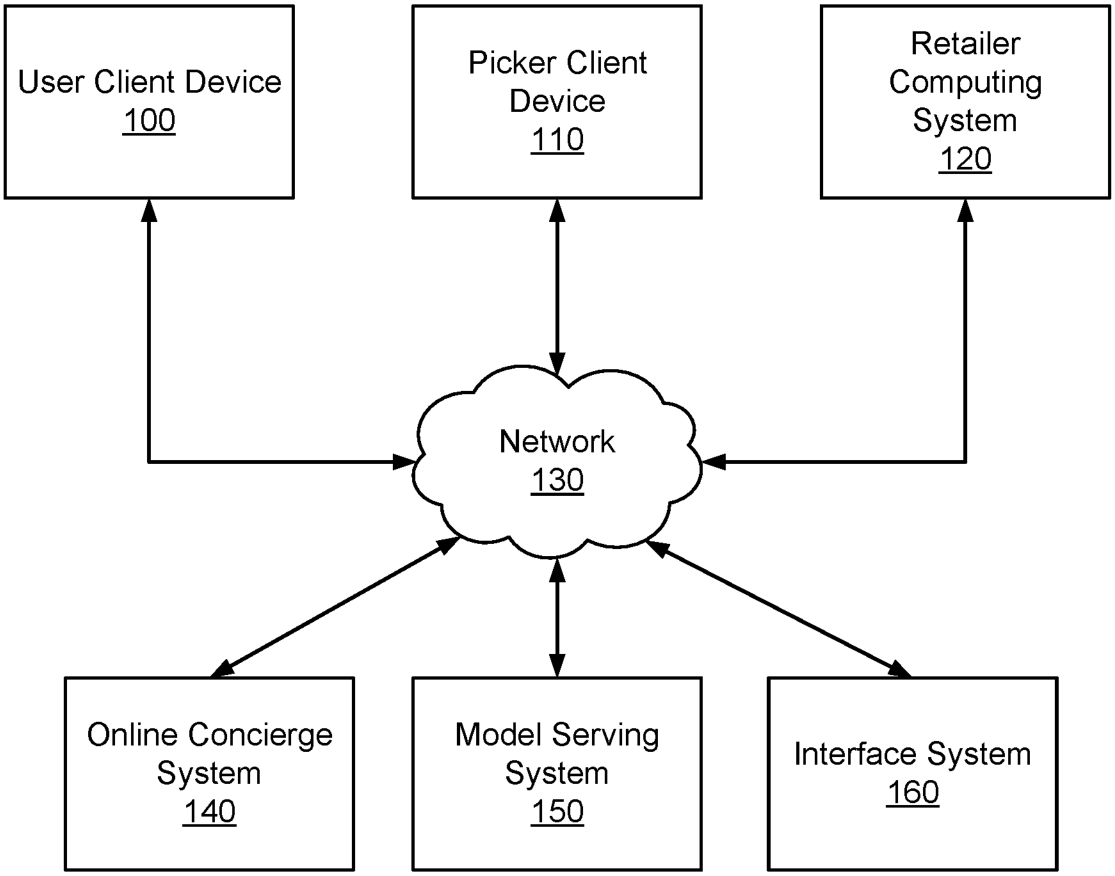
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a user client device 100, a picker client device 110, a retailer computing system 120, a network 130, and an online concierge system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1A, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 allows users of the online concierge system 140 to acquire items using credits from various directed spending programs (e.g., Electronic Benefit Transfer (EBT), Fresh Funds, Medicare, Health Savings Account (HSA), Flexible Spending Account (FSA), etc.) instead of cash, debit cards, and/or credit cards. To help the users spend their credits before the credits expire, the online concierge system 140 may predict whether a particular user of the online concierge system 140 has one or more credits in a directed spending program that will likely expire before being used (e.g., EBT funds that expire at the end of each month). In other words, the online concierge system 140 may predict whether the user has monetary funds that are at risk of expiring and allocate a corresponding risk score to that particular user. If the online concierge system 140 predicts that the one or more credits of the user will likely expire before being used (e.g., when the user's risk score is above a threshold score), the online concierge system 140 may determine whether the user has any items in their cart that are eligible for the directed spending program that is predicted to be unused. For example, the online concierge system 140 may prompt the user with a recommendation to increase a quantity of a weighted item from a user's cart and use at least a portion of a credit that is about to expire for purchasing the weighted item with the increased quantity. By tying the recommendation to the "weighted item" that is already in the cart, the online concierge system effectively increases a likelihood of upselling the "weighted item" which the user already wants as opposed to other items that they may have no relationship to in the current cart context. Additionally or alternatively, the online concierge system 140 may suggest to the user one or more items to buy not being part of the current order but being eligible for the monetary funds (i.e., credits) that are otherwise likely to expire before being used.

The model serving system 150 receives requests from the online concierge system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online concierge system 140 may prepare (e.g., via a prompt generation module 270 in FIG. 2) a prompt for input to the LLM of the model serving system 150. The prompt may include information about a cluster of users where a user is placed based on how likely is that the user will not use a credit before expiration (e.g., identification of the cluster), current content of a cart of the user (e.g., types of items in the cart, a quantity of each item in the cart, a total monetary value of the cart, a number of items in the cart, etc.), and information about one or more credit that are about to expire (e.g., types of credits, an expiration date of each credit, a monetary fund of each credit, etc.). The online concierge system 140 may receive a response to the prompt from the model serving system 150 based on execution of the machine-learning model using the prompt. The response may include a risk score for the user of not using the one or more credits before their expiration, where the risk score is proportional to a likelihood of the user not using the one or more credits before their expiration. The online concierge system 140 may import the response from the model serving system 150 and use the response to determine one or more item from the cart and a quantity of each of the one or more items for recommendation to the user so that the user may use at least a portion of the one or more credits to purchase the recommended quantity of item(s). Alternatively or additionally, the online concierge system 140 may use the response to determine an item that is not in the cart but there is a high likelihood that the user will use at least a portion of the credit to purchase this particular item. Additionally, the online concierge system 140 may use the response to generate a push notification for the user reminding the user to spend at least a portion of unused credits on one or more eligible items from the cart.

In one or more embodiments, the task for the model serving system 150 is based on knowledge of the online concierge system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
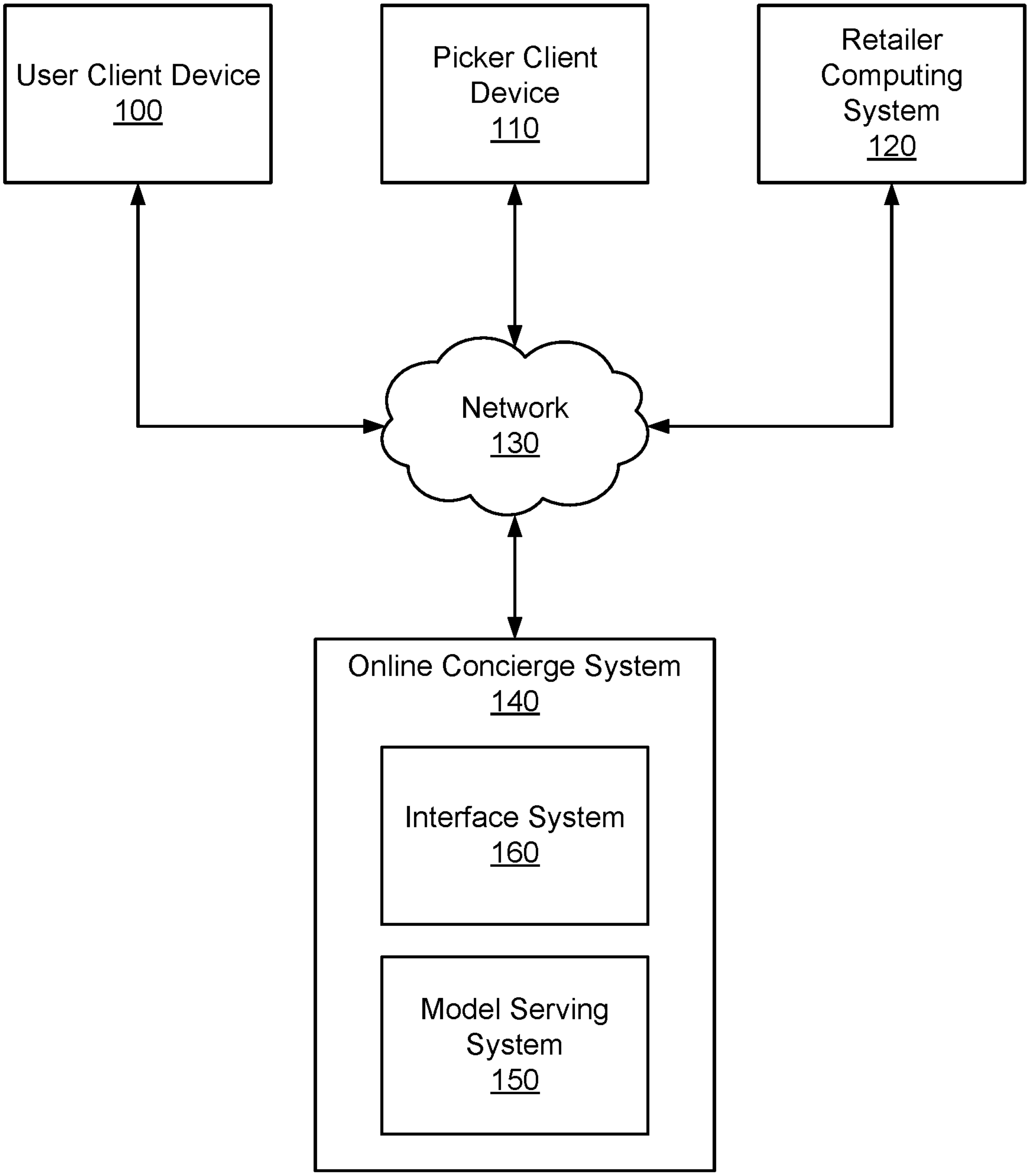
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a user client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Figure 2:
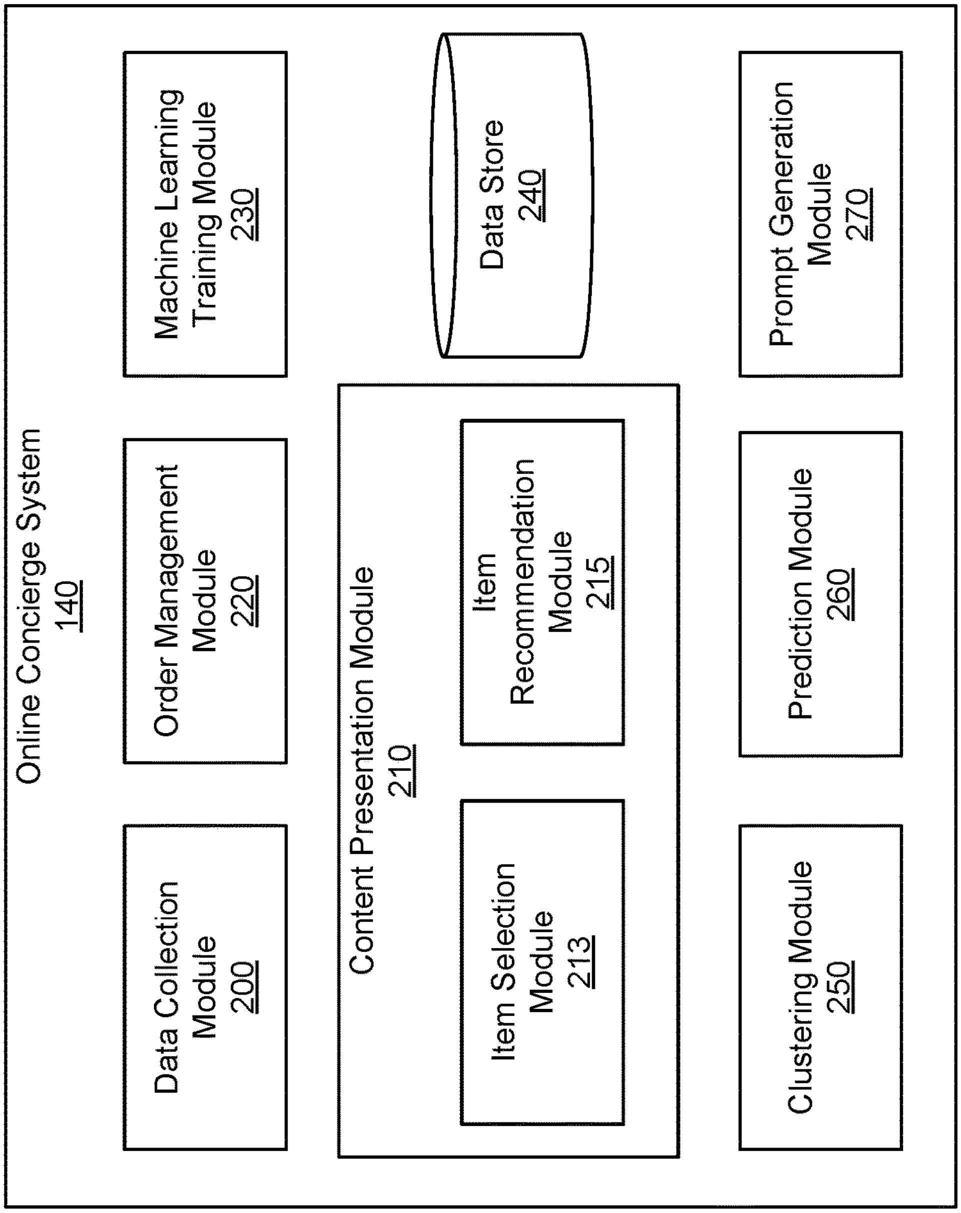
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a clustering module 250, a prediction module 260, and a prompt generation module 270. The content presentation module 210 may include an item selection module 213 and an item recommendation module 215. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. For example, the machine-learning training module 230 may train the item selection model, the availability model, or any of the machine-learning models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online concierge system 140. In one or more other embodiments, when the model serving system 150 is included in the online concierge system 140, the machine-learning training module 230 may further train parameters of the machine-learning model based on data specific to the online concierge system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

The clustering module 250 may cluster a collection of users of the online concierge system 140 by their risk of not spending a set of unused credits provided to the users by one or more programs (e.g., directed spend programs) before their expiration. In one or more embodiments, the clustering module 250 may bucket the collection of users into a set of clusters in accordance with one or more defined rules and based on user data associated with the users. The user data may include historical information of whether each of the users has one or more expired funds, information about a number of credits used for previous orders/purchases, temporal information indicating whether or not the user is at risk of having their funds expiring, etc. All users within a cluster of the set of clusters may have a similar risk of not using at least some of the set of unused credits before their expiration, e.g., each user within the cluster may be associated with a respective risk metric that is within a threshold value from a defined cluster risk metric value.

In one or more other embodiments, the clustering module 250 applies a clustering computer model (e.g., machine-learning computer model) to cluster the users into the set of clusters based on how likely is that the users will not use the set of unused credits before their expiration. The clustering module 250 may access the clustering computer model trained to identify one or more embeddings (e.g., features) that describe each user. The clustering module 250 may deploy the clustering computer model to run a machine-learning algorithm to identify, based at least in part on user data associated with each user, the one or more embeddings for each user. The user data may include historical information of whether that particular user has one or more expired funds, information about a number of credits the user used for previous orders/purchases, temporal information indicating whether or not the user is at risk of having their funds expiring, etc. The clustering computer model may further utilize the one or more embeddings that describe each user in order to cluster the users into the set of clusters. The clustering computer model may apply a clustering scheme (e.g., k-means clustering, hierarchical clustering, etc.) on identified embeddings for the users to cluster the users into the set of clusters. The clustering computer model may be thus trained to use the clustering scheme to group users together into cohorts that are defined by how at risk each user is of having their funds expire. A set of parameters for the clustering computer model may be stored at one or more non-transitory computer-readable media of the clustering module 250. Alternatively, the set of parameters for the clustering computer model may be stored at one or more non-transitory computer-readable media of the data store 240. In one or more embodiments, the clustering computer model is trained and re-trained by the machine-learning training module 230, as further described below.

Information about the set of clusters generated by clustering module 250 may be provided to the prediction module 260 and/or the prompt generation module for generating a prompt for an LLM (e.g., the LLM of the model serving system 150). As further described below, the information about the set of clusters may be utilized by the prediction module 260 and/or the LLM to compute a risk score for a particular user representing a likelihood of the user not using the set of unused credits before their expiration.

The prediction module 260 may predict an expiration of a set of unused credits provided to a user of the online concierge system 140 by a set of programs associated with the user (e.g., directed spend programs). A predicted expiration of the set of unused credits may correspond to a predicted likelihood that at least some of the set of unused credits will expire or an amount (e.g., a number or a percentage) of the set of unused credits that is predicted to expire. For example, if a set of unused credits includes $100.00 in credits, the prediction module 260 may predict a likelihood that at least a portion of the $100.00 in credits will expire before being used. Alternatively, in the above example, the prediction module 260 may predict that 70% or $70.00 of the $100.00 in credits will likely expire before being used. The prediction module 260 may predict an expiration of the set of unused credits based on a set of user data for the user (e.g., information describing the set of unused credits or a frequency with which each payment instrument associated with the user is used), temporal information (e.g., the current date or time of the month), a risk category of the user (e.g., information about a cluster of users where this particular user is clustered via the clustering module 250), or any other suitable types of information. For example, suppose that user data for the user indicates that the user has $100.00 in unused credits provided by a program associated with the user that expire on Oct. 4, 2023 and that temporal information indicates that a current date is Oct. 3, 2023, such that the $100.00 in unused credits will expire tomorrow. In this example, based on the user data for the user and the temporal information, the prediction module 260 may predict a 99% likelihood that at least some of the set of unused credits provided to the user by the program will expire or that $100.00 of the set of unused credits will likely expire. Alternatively, in the above example, suppose that the user data for the user also indicates that the user usually places orders that cost an average of $100.00 once a week and that credits previously provided to the user were used to cover about half the cost of the user's previous orders, while a payment instrument corresponding to a credit card associated with the user was used to cover the other half. In this example, the prediction module 260 may predict a 50% likelihood that at least some of the set of unused credits will expire or that $50.00 of the set of unused credits will likely expire.

The prediction module 260 may access a prediction computer model (e.g., machine-learning computer model) trained to compute a likelihood of the user not using at least some of the set of unused credits before their expiration. The prediction module 260 may deploy the prediction computer model to run a machine-learning algorithm to compute, based on one or more inputs to the prediction computer model, a risk score representing the likelihood of the user not using at least some of the set of unused credits before their expiration. The risk score computed by the prediction computer model may be between 0 and 1, where the risk score closer to 1 indicates a high likelihood of the user not using at least some of the set of unused credits before their expiration, and the risk score closer to 0 indicates a low likelihood of the user not using at least some of the set of unused credits before their expiration (or high likelihood that the user will use at least some of the set of unused credits before their expiration). A set of parameters for the prediction computer model may be stored at one or more non-transitory computer-readable media of the prediction module 260. Alternatively, the set of parameters for the prediction computer model may be stored at one or more non-transitory computer-readable media of the data store 240.

In one or more embodiments, the prediction computer model is a multi-task model that predicts a likelihood of expiration of the set of unused credits provided to the user. To use the prediction computer model, the prediction module 260 may access the prediction computer model (e.g., the set of parameters stored at the data store 240) and apply the prediction computer model to a set of inputs. The set of inputs may include various types of information described above, such as a set of user data for the user, temporal information, etc. For example, the set of inputs may include information about a cluster of users where this particular user is clustered (e.g., via the clustering module 250) based on how likely is that the user will not use at least some of the set of unused credits before their expiration. The set of inputs may further include information describing the set of unused credits, such as, a number of unused credits, one or more expiration dates for the set of unused credits, information describing items that may be acquired using the set of unused credits, etc. In this example, the set of inputs also may include historical order or purchase information associated with the user, such as, items ordered/purchased, frequency of orders placed with the online concierge system 140, frequency of purchases made with retailers associated with the online concierge system 140, total cost associated with previous orders/purchases, number of credits provided by the program used for previous orders/purchases, information about a current order placed by the user (e.g., content of the user's cart), etc. In the above example, the set of inputs also may include temporal information, such as information describing a current date, a number of days until the end of the current month, a number of days before expiration of any of the set of unused credits, etc.

Once the prediction module 260 applies the prediction computer model to a set of inputs, the prediction module 260 may receive an output from the prediction computer model corresponding to a predicted likelihood of expiration of the set of unused credits before spending at least some portion of the set of unused credits. The output from the prediction computer model may correspond to a risk score for the user that indicates or is proportional to a likelihood that some or all of the set of unused credits provided to the user by the program will expire. Alternatively, the output from the prediction computer model may correspond to a value, such as a dollar amount, a percentage, etc. that indicates a predicted amount of the set of unused credits provided to the user by the program that will expire. In one or more embodiments, the prediction computer model is trained and re-trained by the machine-learning training module 230, as further described below.

The prompt generation module 270 may generate a prompt for input into a LLM (e.g., the LLM of the model serving system 150). The prompt may include contextual information about a given user of the online concierge system 140 and information describing a set of unused credits provided to the user by a set of programs associated with the user. The contextual information about the user may include an identification of a cluster where the user is grouped (e.g., via the clustering module 260) that represents general information on whether the user is at risk of not using some portion of the set of unused credits before their expiration. The information describing the set of unused credits may include, e.g., a number of unused credits, one or more expiration dates for the set of unused credits, information describing items that may be acquired using the set of unused credits, etc. The prompt input into the LLM may further include order specific information, i.e., information about current content of a user's shopping cart (e.g., types of items in the cart, a quantity of each item in the cart, a total monetary value of the cart, a number of items in the cart, information about eligibility of each item in the cart to any of the unused credits, etc.).

Based on the prompt input into the LLM, the LLM may generate a response that includes a risk score for the given user, where the risk score is indicative of a likelihood of the user not using at least some of the set of unused credits before their expiration. The risk score output by the LLM may be between 0 and 1, where the risk score closer to 1 indicates a high likelihood of the user not using at least some of the set of unused credits before their expiration. And, the risk score closer to 0 indicates a low likelihood of the user not using at least some of the set of unused credits before their expiration (or high likelihood that the user will use at least some of the set of unused credits before their expiration). Hence, the LLM may predict whether the user will have one or more unspent funds that are expired. The risk score output by the LLM may be imported to the online concierge system 140, e.g., via the content presentation module 210.

A user of the online concierge system 140 may create a shopping cart of items, and one or more items in the cart may be "weighted items" (e.g., produce, meat, etc.) that are eligible for a set of unused credits provided to the user by one or more programs associated with the user. Even before starting an order (or, alternatively, during creation of the shopping cart), the user may be grouped (e.g., via the clustering module 250) into a corresponding cluster of users (e.g., cohort of users) based on how likely is that the user will not use the set of unused credits before their expiration. At the checkout (or at some point before the checkout, such as at picking time when a picker is fulfilling the order), the online concierge system 140 computes (e.g., using the LLM or the prediction computer model) a risk score for the user indicative of a likelihood of the user not using at least some of the set of unused credits.

Upon obtaining the risk score for the user and the user's current order information, the content presentation module 210 may determine whether and what amount of an item (e.g., "weighted item") that is already in the shopping cart to recommend to the user for purchasing using at least some of unused credits before their expiration. Alternatively or additionally, the content presentation module 210 may identify an item that is not in the user's shopping cart for recommendation to the user so that the user can purchase the recommended item using at least some of unused credits before their expiration.

In one or more embodiments, the item selection module 213 of the content presentation module 210 receives the risk score for the user as well as the current order information and determines, by applying a defined set of item selection rules on the risk score and the current order information, what quantity (or amount) of an item from the shopping cart to upsell to the user so that the user would spend at least a portion of an unused credit that is about to expire. Hence, the item selection module 213 may select which weighted item(s) in the shopping cart to upsell relative to others. For example, for unused health funds (e.g., HSA, FSA, etc.), the item selection module 213 may select for recommendation to the user to buy more fish rather than beef. Note that the item selection module 213 applies the item selection rules that are appropriately set so that the item selection module 213 would not suggest quantities that are overly large and inappropriate, i.e., the item selection rules may define an upper threshold of quantity for a specific type of produce. For example, if the user is currently ordering a pound of beef, the item selection module 213 may suggest to the user to buy, e.g., only another pound but not 10 pounds. Additionally, the item selection module 213 may utilize item specific markers to determine which weighted items to recommend to the user to adjust the weights for.

In one or more other embodiments, the content presentation module 210 may use an item recommendation computer model (e.g., machine-learning computer model) to identify an item that is not part of the user's cart for recommendation to the user so that the user can spend at least a portion of one or more unused credits for purchasing the recommended item. The item recommendation module 215 of the content presentation module 210 may access the item recommendation computer model that is trained to identify an item for recommendation to the user. The item recommendation module 215 may deploy the item recommendation computer model to run a machine-learning algorithm to identify, based on the risk score for the user and content of the shopping cart, the item for recommendation to the user. A set of parameters for the item recommendation computer model may be stored at one or more non-transitory computer-readable media of the item recommendation module 215. Alternatively, the set of parameters for the item recommendation computer model may be stored at one or more non-transitory computer-readable media of the data store 240.

As recommending addition of one or more new items to the existing shopping cart can lead to a user having more wasted food, the item recommendation computer model may identify a recipe (or collection of items) for suggestion to the user in order to help them using the extra food added to the shopping cart. Alternatively, the item recommendation computer model may identify one or more new items for suggestion to the user that have longer shelf lives (i.e., can be used for a prolonged time period), e.g., pre-sealed packs of ground beef, other frozen meat, frozen fruits, frozen vegetables, dried food, etc. Furthermore, the item selection module 213 (or some other module of the online concierge system 140) may tag to the user the extra increased amount of item(s) to be donated. Alternatively, instead of increasing the amount of weighted item(s), the content presentation module 210 may ask the user if they want to, e.g., round up an amount of weighted item(s) and get a can of soup that could be donated to a food bank.

The content presentation module 210 may cause the user client device 100 to display (e.g., in real time, at checkout, or after checkout) a user interface with one or more suggestions for the user to (i) adjust one more weighted items in the shopping cart (e.g., as selected by the item selection module 213) and/or (ii) place a new item in the shopping cart (e.g., as identified by the item recommendation computer model). The content presentation module 210 may also cause the user client device 100 to display the user interface further with a reminder for the user to use at least a portion of one or more unused credits that are about to expire to purchase at least some of the items in the shopping cart, such as a recommended weighted item with an adjusted quantity and/or the new recommended item. The user may accept the suggestion and add a recommended quantity of weighted item (or some other adjusted quantity of the weighted item) and/or the new recommended item to the shopping cart. Alternatively, the user may simply reject the suggestions and keep the current order as it is. The picker would then fulfill the order, with or without the adjustment of weighted item(s) and/or inclusion of the new item into the shopping cart.

The prompt generation module 270 (or some other module of the online concierge system 140) may request the LLM to generate a notification for the user to spend at least a portion of one or more funds that are about to expire. In one or more embodiments, the same prompt input into the LLM that is used for requesting the LLM to generate a risk score for a given user can also be utilized for requesting the LLM to generate a notification for the user about one or more unused funds that will soon expire. The LLM may utilize user data including historical information about expiring funds associated with the user, past order information, as well as an indication about a cluster where the user was grouped (e.g., via the clustering module 250) based on risk of not spending funds before expiration in order to determine whether to notify the user about expiring funds. For example, if the user spends their unused funds at the end of each month, the LLM may determine that there is no need to generate the notification for this particular user.

The content presentation module 210 may cause the user client device 100 to display a user interface with the notification about unused funds that are about to expire as generated by the LLM. Through the notification, the user may be directed to a storefront that biases towards items they will likely fill their basket with as well as weighted items that are eligible for a specific program (e.g., directed spend program). It should be also noted that the content presentation module 210 may never push the user to utilize an entire unused credit. Also, a notification message for the user about the one or more unused funds should be polite and careful not to demand from the user to spend all unused funds, as well as to inform the user that the use of any unused funds is strictly voluntary where the user satisfaction is a primary objective.

Alternatively or additionally, the content presentation module 210 may cause a picker client device 110 to display a user interface with a notification for a picker that the user has one or more credits that are about to expire. The picker may then choose to remind the user about the one or more used credits that will soon expire, e.g., by sending an appropriate message from the picker client device 110 to the user client device 100 via the network 130. The content presentation module 210 may also cause the picker client device 110 to display the user interface further with a suggestion for a picker to upsell an adjusted quantity of an item from a user's shopping cart. The picker may then send a message to the user (e.g., from the picker client device 110 to the user client device 100 via the network 130) with a recommendation that the user purchases the adjusted quantity of item using at least a portion of one or more credits that are about to expire.

The machine-learning training module 230 may train and re-train the prediction computer model, the LLM and/or the clustering computer model via supervised learning or using any other suitable technique or combination of techniques. Furthermore, the machine-learning training module 230 may train and re-train the prediction computer model, the LLM and/or the clustering computer model based on user data for users of the online concierge system 140 associated with one or more programs that provided credits to the users, such as information describing the expiration of the unused credits provided to the users by the program(s). For example, the machine-learning training module 230 may train and re-train the prediction computer model, the LLM and/or the clustering computer model via supervised learning based on demographic and historical order or purchase information associated with users of the online concierge system 140 associated with one or more programs that provided one or more sets of credits to each user, as well as a number of unused credits provided to each user by each program that expired.

To illustrate an example of how the prediction computer model, the LLM and/or the clustering computer model may be trained and re-trained, suppose that the machine-learning training module 230 receives a set of training examples. In this example, the set of training examples may include attributes of each user associated with one or more programs, such as an age, a geographical region, a household income, etc. associated with each user. In the above example, the set of training examples also may include historical order or purchase information associated with each user, such as information describing items previously ordered/purchased by each user, a date of each previous order/purchase, credit cards, gift cards, or other payment instruments used for each previous order/purchase, a number of credits used for each previous order/purchase, if any, etc. Continuing with the above example, the set of training examples also may include information describing each program associated with each user (e.g., name, type of program, etc.) and information describing a set of credits provided to the user by each program (e.g., number of credits included in the set, items that may be acquired using the set of credits, an expiration of the set of credits, etc.). In the above example, the machine-learning training module 230 also may receive labels which represent expected outputs of the credit expiration prediction model, in which a label describes an expiration of a set of unused credits provided to a user by a program. In this example, a label may indicate whether some or all of a set of unused credits provided to a user by a program expired. In the above example, a label also or alternatively may indicate an amount (e.g., a number or a percentage) of a set of unused credits provided to a user by a program that expired. Continuing with this example, the machine-learning training module 230 may then train the prediction computer model, the LLM and/or the clustering computer model based on the attributes, as well as the labels by comparing its output from input data of each training example to the label for the training example.

In one or more embodiments in which the item recommendation module 215 accesses the item recommendation computer model that is trained to identify a set of one or more recommended items for a user, the machine-learning training module 230 may train and re-train the item recommendation computer model. The machine-learning training module 230 may train and re-train the item recommendation computer model via unsupervised learning (e.g., using a clustering algorithm) or using any other suitable technique or combination of techniques. Furthermore, the machine-learning training module 230 may train and re-train the item recommendation computer model based on user data for users of the online concierge system 140, such as user data for users associated with one or more programs that provided credits to the users. The user data may describe historical information (e.g., historical order, purchase, or interaction information) associated with the users. For example, the user data may describe items included in shopping lists or previous orders placed by the users or items the users browsed (e.g., item categories, incentives, brands, etc. associated with the items), dates of the users' previous orders or purchases, etc. The user data also may describe preferences associated with the users (e.g., for certain types of cuisines) or demographic or household information associated with the users (e.g., an age, a geographical region, a household income, etc. associated with each user). The user data further may describe one or more sets of credits provided to each user by one or more programs associated with the user (e.g., information identifying each program, information identifying items that may be acquired using each set of credits, a number of credits included among each set of credits, etc.), or any other suitable types of user data.

To illustrate an example of how the item recommendation computer model may be trained and re-trained, suppose that the machine-learning training module 230 receives a set of training examples. In this example, the set of training examples may include attributes of each user associated with one or more programs, such as demographic information associated with the user, historical order, purchase, or interaction information associated with the user, information describing one or more sets of credits provided to the user by the program(s), etc. Continuing with this example, the machine-learning training module 230 may group the users into one or more clusters (e.g., via k-means or hierarchical clustering) based on the user data for the users, such that users included in the same cluster have at least a threshold measure of similarity to each other. In the above example, users included in the same cluster may have similar preferences and demographic information and may have previously ordered or purchased items associated with the same item categories or with the same incentives, etc. In the above example, based on user data for users in the same cluster, the machine-learning training module 230 may train the item recommendation computer model by identifying one or more items for which each user included in a corresponding cluster is likely to have an affinity (e.g., using an association rule algorithm). As described above, in some embodiments, the item recommendation computer model uses item embeddings describing items and user embeddings describing users to identify a set of one or more recommended items for a user. In the above example, the machine-learning training module 230 may identify the item(s) for which each user included in a cluster is likely to have an affinity by generating a user embedding for each user and an item embedding for each item included among an inventory of each retailer associated with the online system 140 and clustering the user embeddings. In this example, the machine-learning training module 230 may then identify one or more item embeddings within a threshold distance of a corresponding cluster of user embeddings, in which the item embedding(s) is/are generated for the item(s).

The set of parameters of the prediction computer model, the set of parameters of the LLM, the set of parameters of the clustering computer model, and/or the set of parameters of the item recommendation computer model may continuously be fine-tuned (e.g., via the machine-learning training module 230) as the online concierge system 140 gather retention and satisfaction data from the users that these models affect. Each of the prediction computer model, the LLM, the clustering computer model, and the item recommendation computer model may optimize itself and find equilibrium in the amount of users that are exposed to with the amount of user satisfaction and retention gains that the online concierge system 140 gather.

The machine-learning training module 230 may collect feedback data with information about a conversion by a user of any item recommended to the user for updating a current order, where the conversion is performed by spending at least a portion of an unused credit that will soon expire. The machine-learning training module 230 may update, based at least in part on the collected feedback data, at least one of the set of parameters of the clustering computer model, the set of parameters of the LLM, the set of parameters of the prediction computer model, or the set of parameters of the item recommendation computer model.

Figure 3:
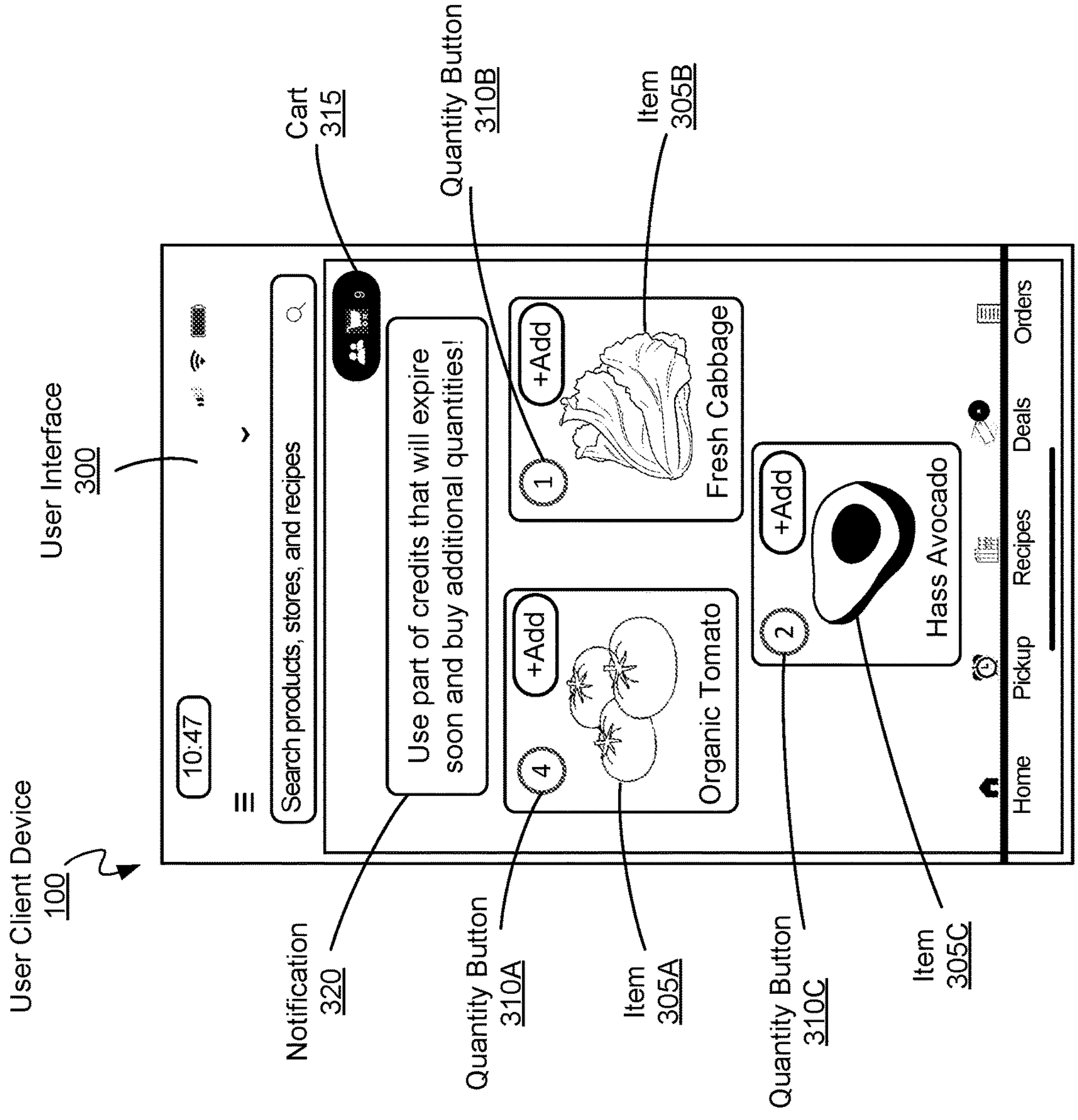
FIG. 3 illustrates an example user interface of a user client device with recommended content for updating a current order placed by a user of an online concierge system, in accordance with one or more embodiments.

FIG. 3 illustrates an example user interface 300 of the user client device 100 with recommended content for updating a current order placed by a user of the online concierge system 140, in accordance with one or more embodiments. The content presentation module 210 causes the user client device 100 to display the user interface 300 during an ordering session of the user (e.g., before the checkout or at the checkout). The content presentation module 210 causes the user interface 300 to display a weighed item 305A (e.g., "Organic Tomato") with a suggested additional quantity as indicated by a quantity button 310A, a weighed item 305B (e.g., "Fresh Cabbage") with a suggested additional quantity as indicated by a quantity button 310B, and a weighed item 305C (e.g., "Hass Avocado") with a suggested additional quantity as indicated by a quantity button 310C. As discussed above, the weighted items 305A, 305B, 305C and the suggested additional quantities may be selected by the item selection module 213. Each of the weighted items 305A, 305B, 305C may already be included in a cart 315 (i.e., the user's current order). The user may utilize the user interface 300 to add any of the weighted items 305A, 305B, 305C having the suggested additional quantities into the cart 310. Although FIG. 3 shows the user interface 300 with three suggested weighted items, the user interface 300 may display fewer or additional items (which are not necessarily produce items that are already in the cart 315). The user may also use any of the quantity buttons 310A, 310B, 310C to make changes to any of the suggested quantities. The content presentation module 210 may also cause the user client device 100 to further display the user interface 300 with a notification 320 prompting the user to spend a part of credits that will expire soon on any of the weighted items 305A, 305B, 305C having the suggested additional quantities. Alternatively, the user may ignore these suggestions and proceed to the checkout without updating the cart 315.

FIG. 4 is a flowchart for a method of using a language model to generate a recommendation for a user of an online concierge system to update an order placed at the online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 groups 405 (e.g., via the clustering module 250) a user of the online concierge system 140 into a cluster of users, based at least in part on how likely is that the user will not use, before expiration, a credit provided to the user that expires after a threshold amount of time. In one or more embodiments, the online concierge system 140 clusters (e.g., via the clustering module 250), based at least in part on user data associated with a set of users of the online system including the user, the set of users into the cluster, each user within the cluster associated with a respective risk of not using one or more credit of the set of credits before expiration that is within a threshold value from a defined risk metric.

In one or more other embodiments, the online concierge system 140 accesses a clustering computer model of the online concierge system 140 (e.g., via the clustering module 250) trained to identify an embedding for each user of a plurality of users of the online system. The online concierge system 140 may apply the clustering computer model (e.g., via the clustering module 250) to identify, based at least in part on user data associated with to each user of the plurality of users, the embedding for each user. The online concierge system 140 may apply the clustering computer model (e.g., via the clustering module 250) to cluster, based at least in part on the embedding for each user of the plurality of users, the plurality of users into a set of one or more clusters including the cluster. The online concierge system 140 may apply (e.g., via the clustering computer model) k-means clustering on a plurality of embeddings for the plurality of users to cluster the plurality of users into the set of one or more clusters. The online concierge system 140 may collect (e.g., via the machine-learning training module 230) feedback data with information about a conversion by the user of at least one of the quantity of the first item or the second item. The online concierge system 140 may re-train at least one of the clustering computer model or the LLM by updating (e.g., via the machine-learning training module 230), based at least in part on the collected feedback data, at least one of the set of parameters of the clustering computer model or the set of parameters of a LLM (e.g., LLM of the model serving system 150).

The online concierge system 140 generates 410 (e.g., via the prompt generation module 270) a prompt for input into a LLM (e.g., LLM of the model serving system 150), the prompt including information about the cluster, content of a cart of the user, and information about the credit. The online concierge system 140 requests 415 (e.g., via the prompt generation module 270) the LLM to generate, based on the prompt input into the LLM, a risk score for the user representing a likelihood of the user not using the credit before the expiration.

The online concierge system 140 identifies 420 (e.g., via the item selection module 213 and/or the item recommendation module 215), based at least in part on the risk score and the content of the cart, at least one of a quantity of a first item from the cart or a second item not being in the cart for recommendation to the user. In one or more embodiments, the online concierge system 140 applies (e.g., via the item selection module 213) a set of rules to the risk score and the content of the cart to identify the quantity of the first item for recommendation to the user. The online concierge system 140 may select (e.g., via the item selection module 215), based at least in part on the risk score, the first item from the cart. The online concierge system 140 may apply (e.g., via the item selection module 213) an upper threshold of quantity to identify the quantity of the first item for recommendation to the user.

In one or more other embodiments, the online concierge system 140 accesses an item recommendation computer model of the online concierge system 140 (e.g., via the item recommendation module 215) trained to identify a replacement item for recommendation to the user. The online concierge system 140 may apply the item recommendation computer model to identify, based at least in part on the risk score and the content of the cart, the second item for recommendation to the user. The online concierge system 140 may collect (e.g., via the machine-learning training module 230) feedback data with information about a conversion by the user of the second item. The online concierge system 140 may re-train at least one of the item recommendation computer model or the LLM by updating (e.g., via the machine-learning training module 230), based at least in part on the collected feedback data, at least one of the set of parameters of the item recommendation computer model or the set of parameters of the LLM.

The online concierge system 140 causes 425 (e.g., via the content presentation module 210) a device associated with the user (e.g., the user client device 100) to display a user interface with a suggestion for the user to include at least one of the quantity of the first item or the second item in the cart and to use at least a portion of the credit for purchasing at least a portion of the cart. The online concierge system 140 may request the LLM (e.g., via the prompt generation module 270) to generate, based on the prompt input into the LLM, a notification for the user to use at least the portion of the credit before the expiration. The online concierge system 140 may cause (e.g., via the content presentation module 210) the device associated with the user to display the user interface further with the generated notification.

In one or more embodiments, the online concierge system 140 accesses a prediction computer model of the online concierge system 140 (e.g., via the prediction module 260) trained to compute a likelihood of the user not using a set of one or more credits provided to the user before expiration of the set of one or more credits. The online concierge system 140 may apply the prediction computer model (e.g., via the prediction module 260) to compute, based at least in part on information about the cluster, content of a second cart of the user and information about the set of one or more credits, a second risk score representing the likelihood of the user not using the set of one or more credits. The online concierge system 140 may identify (e.g., via the item selection module 213 and/or the item recommendation module 215), based at least in part on the second risk score and the content of the second cart, at least one of a quantity of a third item from the second cart or a fourth item not being in the cart for recommendation to the user. The online concierge system 140 may cause (e.g., via the content presentation module 210) the device associated with the user to display the user interface with a second suggestion for the user to include at least one of the quantity of the third item or the fourth item in the second cart and to use at least a portion of the set of one or more credits for purchasing the second cart.

Embodiments of the present disclosure are directed to the online concierge system 140 that utilizes a language model (or trained computer model) to predict a risk of not using unspent funds for a directed spend account before their expiration, and upsell weighted items in an order (and/or sell additional items) based on that prediction. It should be noted that every month, around 60% of Medicare Access funds go unspent for a variety of reasons. Similar issues plague other government sponsored and similar programs such as EBT, HSA and FSA. The online concierge system 140 presented herein utilizes a LLM to direct users and/or pickers to adjust weighted items (e.g., meat and produce) in order to maximize the Medicare Access, EBT, HAS, FSA, or any similar directed spend program monetary funds, so that they do not go to waste. This can have the effect of increasing basket size, retention, picker's tip (e.g., if based off of percentage of purchase price), and ultimately user satisfaction.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

grouping a user of an online system into a cluster of users, using information about how likely is that the user will not use, before expiration, a credit provided to the user that expires after a threshold amount of time including information about a number of credits the user used for previous orders and temporal information indicating a time period until the credit expires;

generating a prompt for input into a large language model (LLM), the prompt including information about the cluster, content of a cart of the user, and information about the credit;

requesting the LLM to generate, using the prompt input into the LLM, a risk score for the user representing a likelihood of the user not using the credit before the expiration;

identifying, using the risk score and the content of the cart, at least one of a quantity of a first item from the cart or a second item not being in the cart for recommendation to the user; and causing a device associated with the user to display a user interface with a suggestion for the user to include at least one of the quantity of the first item or the second item in the cart and to use at least a portion of the credit for purchasing the cart.

2. The method of claim 1, further comprising:

accessing a prediction model, wherein the prediction model is a machine-learning model trained to compute a likelihood of the user not using a set of one or more credits provided to the user before expiration of the set of one or more credits;

applying the prediction model to information about the cluster, content of a second cart of the user and information about the set of one or more credits to generate a second risk score representing the likelihood of the user not using the set of one or more credits;

identifying, using the second risk score and the content of the second cart, at least one of a quantity of a third item from the second cart or a fourth item not being in the cart for recommendation to the user; and causing the device associated with the user to display the user interface with a second suggestion for the user to include at least one of the quantity of the third item or the fourth item in the second cart and to use at least a portion of the set of one or more credits for purchasing the second cart.

3. The method of claim 1, wherein grouping the user into the cluster comprises:

clustering, using user data associated with a set of users of the online system including the user, the set of users into the cluster, each user within the cluster associated with a respective risk of not using one or more credits before expiration that is within a threshold value from a defined risk metric.

4. The method of claim 1, further comprising:

accessing a clustering model, wherein the clustering model is a machine-learning model trained to generate an embedding for each user of a plurality of users of the online system;

applying the clustering model to user data associated with each user of the plurality of users to generate the embedding for each user; and applying the clustering model to the embedding for each user to cluster the plurality of users into a set of one or more clusters including the cluster.

5. The method of claim 4, wherein applying the clustering model comprises:

applying k-means clustering to a plurality of embeddings for the plurality of users to cluster the plurality of users into the set of one or more clusters.

6. The method of claim 4, further comprising:

collecting feedback data with information about a conversion by the user of at least one of the quantity of the first item or the second item; and re-training at least one of the clustering model or the LLM by updating, using the collected feedback data, at least one of a set of parameters of the clustering model or a set of parameters of the LLM.

7. The method of claim 1, wherein identifying at least one of the quantity of the first item or the second item comprises:

applying a set of rules to the risk score and the content of the cart to identify the quantity of the first item for recommendation to the user.

8. The method of claim 7, wherein applying the set of rules comprises:

selecting, using the risk score, the first item from the cart; and applying an upper threshold of quantity to identify the quantity of the first item for recommendation to the user.

9. The method of claim 1, wherein identifying at least one of the quantity of the first item or the second item comprises:

accessing an item recommendation model, wherein the item recommendation model is a machine-learning model trained to identify an item for recommendation to the user; and applying the item recommendation model to the risk score and the content of the cart to identify the second item for recommendation to the user.

10. The method of claim 9, further comprising:

collecting feedback data with information about a conversion by the user of the second item; and re-training at least one of the item recommendation model or the LLM by updating, using the collected feedback data, at least one of a set of parameters of the item recommendation model or a set of parameters of the LLM.

11. The method of claim 1, wherein displaying the user interface further comprises:

requesting the LLM to generate, using the prompt input into the LLM, a notification for the user to use at least the portion of the credit before the expiration; and causing the device associated with the user to display the user interface further with the generated notification.

12. A computer program product comprising a non-transitory computer readable storage medium having instructions encoded thereon that, when executed by a processor, cause the processor to perform steps comprising:

grouping a user of an online system into a cluster of users, using information about how likely is that the user will not use, before expiration, a credit provided to the user that expires after a threshold amount of time including information about a number of credits the user used for previous orders and temporal information indicating a time period until the credit expires;

generating a prompt for input into a large language model (LLM), the prompt including information about the cluster, content of a cart of the user, and information about the credit;

requesting the LLM to generate, using the prompt input into the LLM, a risk score for the user representing a likelihood of the user not using the credit before the expiration;

identifying, using the risk score and the content of the cart, at least one of a quantity of a first item from the cart or a second item not being in the cart for recommendation to the user; and causing a device associated with the user to display a user interface with a suggestion for the user to include at least one of the quantity of the first item or the second item in the cart and to use at least a portion of the credit for purchasing the cart.

13. The computer program product of claim 12, wherein the instructions further cause the processor to perform steps comprising:

accessing a prediction model, wherein the prediction model is a machine-learning model trained to compute a likelihood of the user not using a set of one or more credits provided to the user before expiration of the set of one or more credits;

applying the prediction model to information about the cluster, content of a second cart of the user and information about the set of one or more credits to generate a second risk score representing the likelihood of the user not using the set of one or more credits;

identifying, using the second risk score and the content of the second cart, at least one of a quantity of a third item from the second cart or a fourth item not being in the cart for recommendation to the user; and causing the device associated with the user to display the user interface with a second suggestion for the user to include at least one of the quantity of the third item or the fourth item in the second cart and to use at least a portion of the set of one or more credits for purchasing the second cart.

14. The computer program product of claim 12, wherein the instructions further cause the processor to perform steps comprising:

clustering, using user data associated with a set of users of the online system including the user, the set of users into the cluster, each user within the cluster associated with a respective risk of not using one or more credits before expiration that is within a threshold value from a defined risk metric.

15. The computer program product of claim 12, wherein the instructions further cause the processor to perform steps comprising:

accessing a clustering model, wherein the clustering model is a machine-learning model trained to generate an embedding for each user of a plurality of users of the online system;

applying the clustering model to user data associated with each user of the plurality of users to generate the embedding for each user; and applying the clustering model to the embedding for each user to cluster the plurality of users into a set of one or more clusters including the cluster.

16. The computer program product of claim 15, wherein the instructions further cause the processor to perform steps comprising:

applying k-means clustering to a plurality of embeddings for the plurality of users to cluster the plurality of users into the set of one or more clusters.

17. The computer program product of claim 15, wherein the instructions further cause the processor to perform steps comprising:

collecting feedback data with information about a conversion by the user of at least one of the quantity of the first item or the second item; and re-training at least one of the clustering model or the LLM by updating, using the collected feedback data, at least one of a set of parameters of the clustering model or a set of parameters of the LLM.

18. The computer program product of claim 12, wherein the instructions further cause the processor to perform steps comprising:

selecting, using the risk score, the first item from the cart; and applying an upper threshold of quantity to identify the quantity of the first item for recommendation to the user.

19. The computer program product of claim 12, wherein the instructions further cause the processor to perform steps comprising:

accessing an item recommendation model, wherein the item recommendation model is a machine-learning model trained to identify an item for recommendation to the user;

applying the item recommendation model to the risk score and the content of the cart to identify the second item for recommendation to the user;

collecting feedback data with information about a conversion by the user of the second item; and re-training at least one of the item recommendation model or the LLM by updating, using the collected feedback data, at least one of a set of parameters of the item recommendation model or a set of parameters of the LLM.

20. A computer system comprising:

a processor; and a non-transitory computer-readable storage medium having instructions that, when executed by the processor, cause the computer system to perform steps comprising:

grouping a user of an online system into a cluster of users, using information about how likely is that the user will not use, before expiration, a credit provided to the user that expires after a threshold amount of time including information about a number of credits the user used for previous orders and temporal information indicating a time period until the credit expires;

generating a prompt for input into a large language model (LLM), the prompt including information about the cluster, content of a cart of the user, and information about the credit;

requesting the LLM to generate, using the prompt input into the LLM, a risk score for the user representing a likelihood of the user not using the credit before the expiration;

identifying, using the risk score and the content of the cart, at least one of a quantity of a first item from the cart or a second item not being in the cart for recommendation to the user; and causing a device associated with the user to display a user interface with a suggestion for the user to include at least one of the quantity of the first item or the second item in the cart and to use at least a portion of the credit for purchasing the cart.

* * * * *